United States Patent [19]
El-Gaouni

[11] Patent Number: 5,623,916
[45] Date of Patent: Apr. 29, 1997

[54] METHOD AND APPARATUS FOR CUTTING GROOVES INTO DIAMONDS AND PRECIOUS STONES

[76] Inventor: Muntaser H. El-Gaouni, 8919 Beatrice Pl., Rosemead, Calif. 91770

[21] Appl. No.: 401,723

[22] Filed: Mar. 10, 1995

[51] Int. Cl.$^6$ .................................................. B28D 1/02
[52] U.S. Cl. ........................ 125/12; 451/405; 451/450; 451/43; 451/44; 125/30.01
[58] Field of Search .............................. 451/43, 44, 213, 451/214, 257, 450, 405; 125/30.01

[56] References Cited

U.S. PATENT DOCUMENTS

| | | |
|---|---|---|
| 3,897,772 | 8/1975 | Averbuch . |
| 4,292,818 | 10/1981 | Vitau . |
| 4,738,240 | 4/1988 | Aich . |
| 5,003,678 | 4/1991 | Oganesyan . |
| 5,033,447 | 7/1991 | Schulze . |
| 5,119,599 | 6/1992 | Klipper et al. . |
| 5,305,506 | 4/1994 | Forman . |

*Primary Examiner*—Robert A. Rose
*Assistant Examiner*—George Nguyen
*Attorney, Agent, or Firm*—Merchant, Gould, Smith, Edell, Welter & Schmidt, P.A.

[57] ABSTRACT

A device for holding and positioning stones that are being prepared for invisible set jewelry. The device includes an automatically cooled blade and a holding member for holding the stone wherein the position of the stone may be adjusted linearly and angularly about a plurality of orthogonal axes. A base is coupled to three orthogonal translation stages for linearly adjusting the location of the stone with respect to the blade. Further, the base is rotatably coupled to the linear translation stages thereby enabling the linear translation stages to rotate about a first axis of rotation which is orthogonal to the top planar surface of the base. A mounting arm is pivotally coupled to the linear translation stages about a second axis of rotation parallel to the planar surface of the base. The mounting arm includes stone holding means for securing the stone which is rotatable about a third axis of rotation transverse to the first and second axes and which provides linear adjustment to position the stone within the mounting arm. The mounting arm is further pivotable about a fourth axis of rotation orthogonal to the second axis of rotation. Finally, the mounting arm pivots about a fifth axis of rotation parallel to the first axis of rotation for raising and lowering the stone onto the cutting surface of the blade.

13 Claims, 6 Drawing Sheets

FIG. 6

METHOD AND APPARATUS FOR CUTTING GROOVES INTO DIAMONDS AND PRECIOUS STONES

BACKGROUND OF THE INVENTION

1. Field of the Invention

This invention relates in general to a method and apparatus for cutting grooves into diamonds and precious stones for invisible mountings, and more particularly to a method and apparatus for cutting, into diamonds and precious stones, grooves which may be at any angle or position thereby permitting invisible mountings.

2. Description of Related Art

Before diamonds and precious stones are ready for mounting, numerous process steps must be performed. Accordingly, many devices have been developed to improve the effectiveness and ease of performing these various stone processing steps. For example, many devices have been developed for positioning stones relative to a tool. One such device is disclosed in U.S. Pat. No. 5,033,447, issued Jul. 23, 1991, to John C. Schulze, entitled "SUPPORT APPARATUS", and which is incorporated herein by reference. The Schulze support apparatus constitutes a clamping apparatus for mounting and positioning a diamond type dressing stone in proximity to a grinding wheel. The stone may be pivoted up and down relative to a grinding wheel or other stone. However the degree of movement of the stone, which is held by the support apparatus, is limited to pivoting about parallel axes at either end of a support arm. Further, more precise linear adjustments to the position of the stone are not provided.

In the area of cutting stones, many devices have also been developed to improve the effectiveness and ease of performing various process steps. Many diamond cutting machines include a stationary frame which has a sawing disk rotatably mounting on its front end and a swingable arm pivotably mounted on its rear end, which is adapted to carry a stone between a pair of holders. However, it is very critical that the stone be precisely positioned with respect to the sawing disk and that it be firmly held in position during the sawing operation. Any lateral movement of the stone may result in costly damage to the stone.

An example of a device with prevents lateral movement of a stone during the cutting process is disclosed in U.S. Pat. No. 3,897,772, issued Aug. 5, 1975, to Joseph Averbuch, entitled "MACHINE FOR CUTTING PRECIOUS STONES", and which is incorporated herein by reference. The Averbuch precious stone cutting apparatus provides an arrangement for laterally adjusting a stone-carrying, swingable arm. However, the degree of movement of the stone is limited. Again, the stone may be pivoted about parallel axes at either end of a support arm. Further, the lateral movement of the stone may be precisely positioned with respect to the sawing disk and firmly held in place during the sawing operation. Thus, lateral movement of the stone is restricted thereby preventing costly damage to the stone during the cutting process. Nevertheless, additional angular positional adjustments and more precise linear adjustments are not provided.

One particular procedure which has proven to be tedious and therefore difficult to perform using cutting machines is the preparation of stones for invisibly mounting. In order to have a diamond or a colored stone grooved for application in invisible set jewelry, the proper side must be identified. The stone must then be positioned properly to cut the mounting grooves. The grooves are cut parallel to the table below the girdle of the stone. Accordingly, stones intended for use in invisible set jewelry have been grooved by hand or, alternatively, by using ordinary cutting machines.

U.S. Pat. No. 4,738,240, issued Apr. 19, 1988, to Rene M. Aich, assigned to Rene Liotaud and Henri Jean Azema, entitled "PROCESS FOR CUTTING A DIAMOND TO PROVIDE AN INVISIBLE MOUNTING", which is incorporated herein by reference, discloses a process for cutting a diamond to realize an invisible mounting. Cuts, which may be engaged by the mounting, are made below the girdle. The grooves have the shape of a dihedron of which the two surfaces are situated on both sides of the plane of the natural table along which is oriented the polished table. One of the surfaces of the dihedron is substantially parallel to the polished table and the other is inclined at an angle of at least thirty degrees. The two surfaces of each dihedron are also polished using a sawing machine having a carriage for moving the diamond which is movable along a direction parallel to the plane of the sawing disk. When the two surfaces of the dihedron are polished, the setting, as well as the metallic portion engaged in the notch and the notch itself, are invisible and do not alter the dispersion of the stone. Nevertheless, angular positional adjustments and more precise linear adjustments during the groove cutting process are not disclosed.

It can seen then that there is a need for a method and apparatus for cutting grooves into diamonds and precious stones for invisible mountings.

It can also be seen that there is a need for a method and apparatus for cutting, into diamonds and precious stones, grooves which may be at any angle or linear position thereby permitting invisible mountings.

Finally, it can also be seen that there is a need for a method and apparatus for cutting invisible mounting grooves into stones without creating burn marks on the stones.

SUMMARY OF THE INVENTION

To overcome the limitations in the prior art described above, and to overcome other limitations that will become apparent upon reading and understanding the present specification, the present invention discloses a device for holding and positioning stones that are being prepared for invisible set jewelry.

The present invention solves the above-described problems by providing an automatically cooled blade and a holding member for holding the stone wherein the position of the stone may be adjusted linearly and angularly about a plurality of axes.

A system in accordance with the principles of the present invention comprises a base, an adjustable mounting arm for holding a stone, translation stages for providing movement to the stone, and grooving means, coupled to the base, for cutting mounting grooves into the stone. The grooving means comprises a cooling means for dissipating the heat as the grooves are cut into the stone to prevent discoloration of the stone.

One aspect of the present invention is that the base is rotatably coupled to the linear translation stages thereby enabling the linear translation stages to rotate about a first axis of rotation orthogonal to a plane formed by the top surface of the base.

Another aspect of the present invention is that a mounting arm is pivotally coupled to the linear translation stages about a second axis which is parallel to the base.

Another aspect of the present invention is that the mounting arm may be selectively rotated about the second axis.

Another aspect of the present invention is that the mounting arm may be selectively rotated about a third axis of rotation that is parallel to, but disposed at a distance from the first axis of rotation.

Yet another aspect of the present invention is that the mounting arm includes stone holding means for securing the stone which is rotatable about a fourth axis orthogonal to the second axis.

Still another aspect of the present invention is that the grooving means includes a rotating blade which is in communication with a blade receptor containing a liquid coolant for dissipating heat generated by the blade as grooves are cut into the stone.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there is illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the preferred embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an apparatus for cutting grooves into diamonds and precious stones particularly useful for invisible settings. The cutting apparatus includes translation stages disposed between a base and the stone which provides great latitude in the movement of the stone with respect to the blade. Thus, grooves for invisibly mounting stones may be cut into a stone at any angle and at any position.

Figure 1:
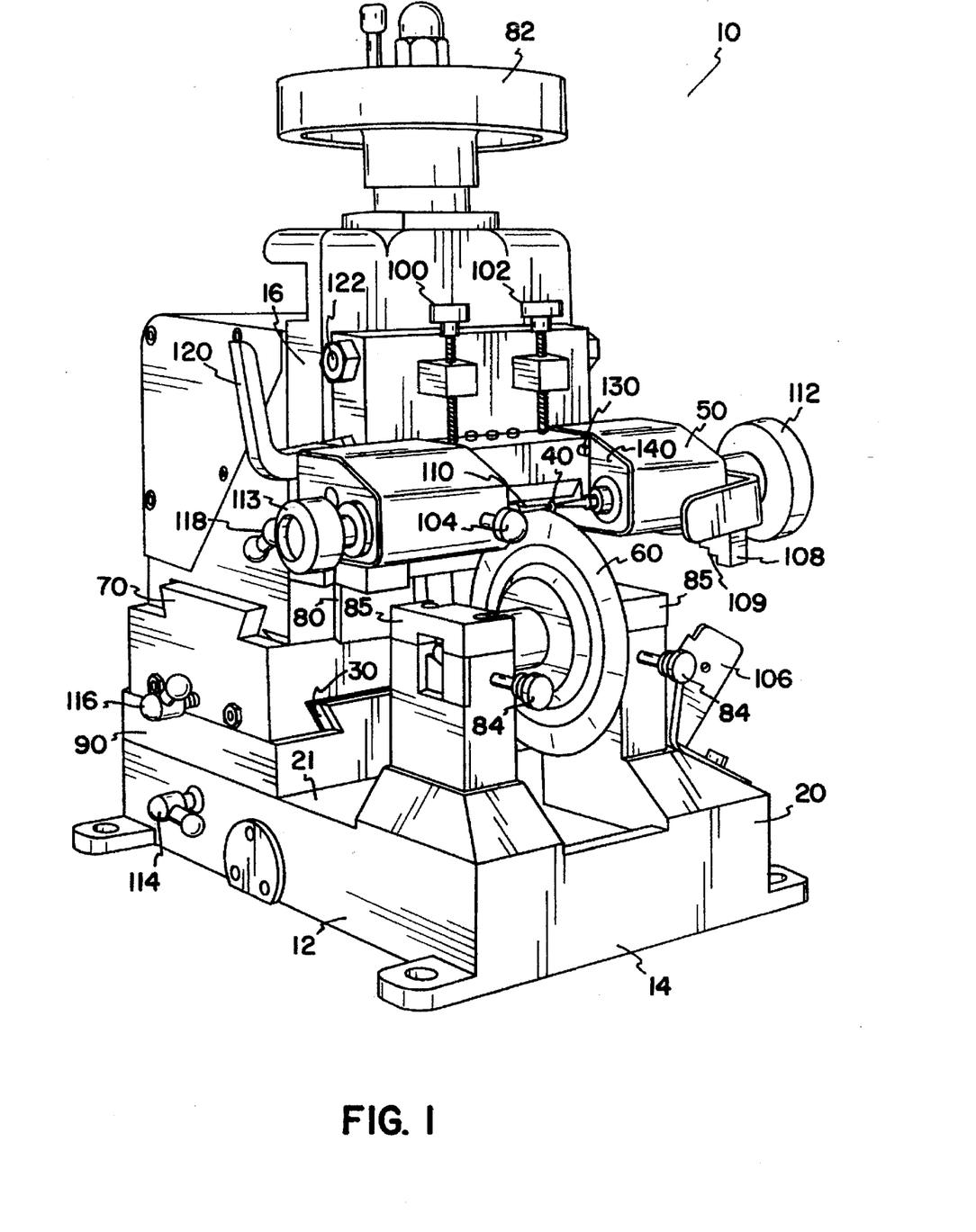
FIG. 1 illustrates a front perspective view of an exemplary system according to the present invention.

FIG. 1 illustrates an exemplary system 10 according to the present invention. Several linear and angular translation stages are provided for moving a stone. A base 20 having a top planar surface 21 provides support for the translation stages. In discussing the movement of the translation stages, the orientation of three axes will be referred to. The orientation of an X axis refers to an axis which is parallel to the side 12 of the base 20 and which runs longitudinally front to back along the side 12. The orientation of a Y axis refers to an axis which is parallel to the front 14 of the base and which runs side to side. The orientation of a Z axis refers to a vertical axis which is orthogonal to the plane formed by the top surface 21 of the base 20, or, stated differently, orthogonal to both the X axis and the Y axis.

A forward to back linear translation stage 30 moves the stone 40 which is held in the mounting arm or cassette 50 along a first axis which is in the X direction and which is parallel to the cutting plane of the blade 60. A left to right linear translation stage 70 aligns the stone 40 in the Y direction along a second axis orthogonal to the plane of the cutting blade 60. Finally, an up and down linear translation stage 80 adjusts the elevation of the stone 40 with respect to the cutting blade 60 along a third axis which is in the Z direction. The up and down linear translation stage 80 is controlled by rotation of knob 82. Knobs 84 are used to release caps 85 so that the blade 60 may be removed. These axes of linear movement need not intersect.

The composite linear translation stages may be rotated about a fourth axis which is in the Z direction and parallel to, but disposed from the third axis thereby adjusting the angle in which the blade 60 engages the stone 40. During this angular adjustment, the bottom 90 of the forward to back linear translation stage 30 rotates about the fourth axis while the base 20 remains stationary.

The mounting arm may be rotated about a fifth axis which extends through the center of the mounting arm or cassette 50. This fifth axis is parallel to, but disposed from the second axis of linear movement and is in the X direction. Knobs 100 and 102 are loosened to allow rotation of the mounting arm 50. Knobs 100 and 102 may also be used to adjust the angle of the mounting arm 50. Knob 104 is a lock which secures the position of the stone within the cassette 50. Stop 106 is used to limit the rotation of the mounting arm 50 by engaging with guide 108. Guide 108 has a stepped surface 109 which may be adjusted to vary the rotational displacement of the mounting arm 50.

The stone 40 is held by finger elements 110 which extend from the mounting arm 50 along a sixth axis which is orthogonal to the fifth axis. The mounting arm 50 has a slotted gear mechanism (not shown) which allows the stone 40 to be rotated about the sixth axis. This rotation of the stone 40 about the sixth axis is controlled by turning knob 112. Thus, the angular position of the stone may be rotated about a plurality of orthogonal axes. Further, knob 113 adjusts the linear position of stone 40 along the sixth axis formed by the finger elements 110. Thus, the finger elements are slid from side to side within the mounting arm by adjusting knob 113.

The position of the mounting arm 50 may also be pivoted about a seventh axis which is generally in the Z direction and which is also orthogonal to the fifth axis. A pair of screws 130, located in cavity 140 (one being obscured in this view by the mounting arm 50), are adjusted to pivot the mounting arm 50 about this axis. The screw which is obscured in FIG. 1 is symmetrically disposed on the mounting arm 50 at the opposite side of the cavity 140 from the first screw. Nevertheless, the adjustment of screws 130 provide a fine adjustment to the angular position of the stone 40 with respect to the blade 60.

FIG. 1 also illustrates certain locks which may be adjusted to prevent particular movement of the translation stages. Z rotational lock 114 prevents the bottom 90 of the forward and backward linear translation stage 30 from rotating about the fourth axis with respect to the base 20. X linear lock 116 prevents the forward and backward movement of the X linear translation stage 30 along the first axis. Z linear lock 118 (partially obscured in FIG. 1) prevents the up and down movement of the Z translation stage 80 along the third axis. Lever 120 is used to release the cassette 50 so that it may pivot about an eighth axis 122 which is in the Y direction and parallel to, but disposed apart from the second axis and which allows the stone 40 to be swung away from the blade 60. Other locking mechanism will be described with reference to FIGS. 2–4.

Figure 2:
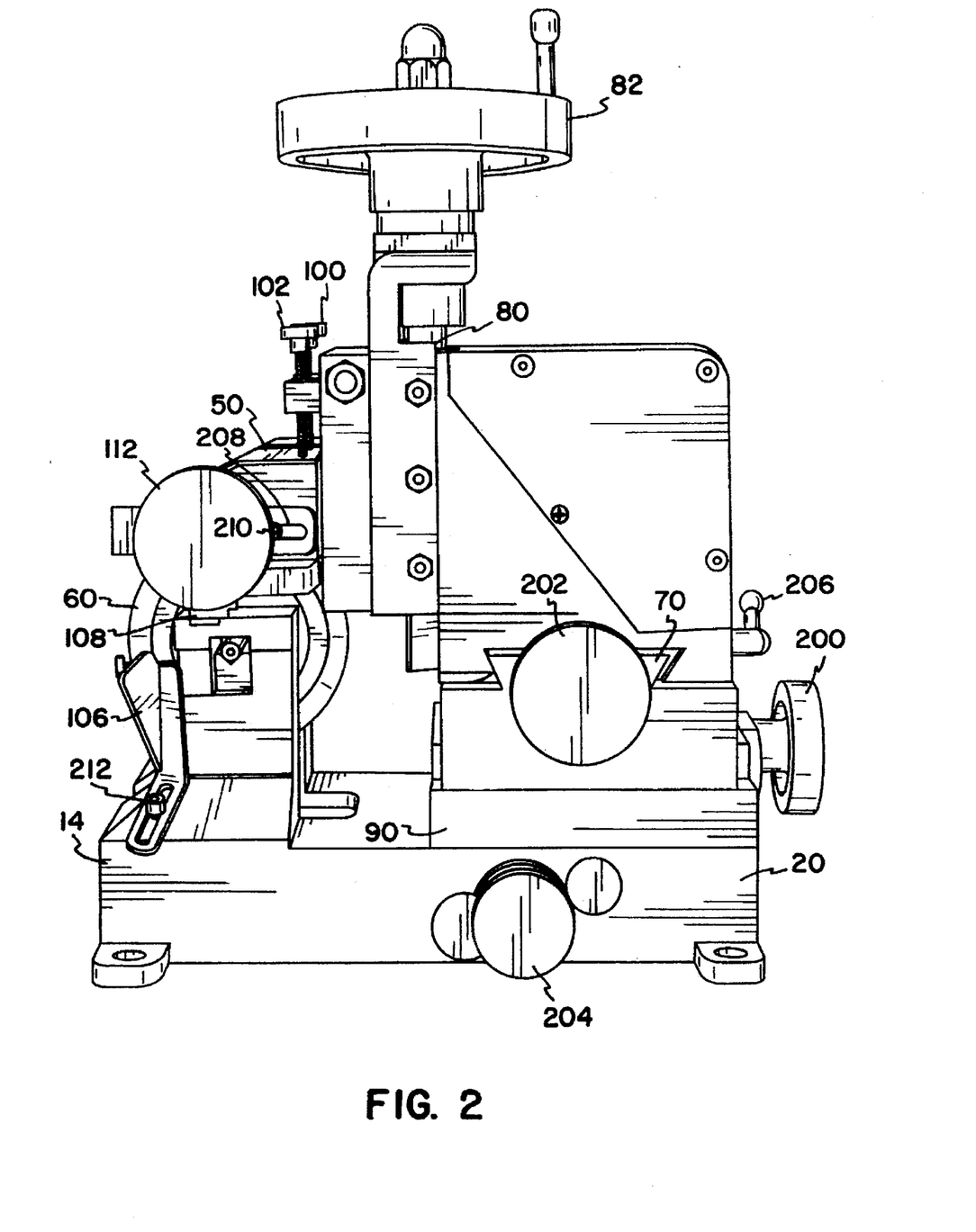
FIG. 2 illustrates a right side view of the groove cutting system according to the present invention.

FIG. 2 illustrates a right side view of the groove cutting system 10 in accordance with the invention. In FIG. 2, mechanisms for adjusting the position of the linear and angular translation stages are prominent. Knob 200 is used to adjust the forward and backward linear translation stage along the first axis. Knob 202 is used to adjust the left to right linear translation stage along the second axis. Knob 204 is used to rotate the composite linear translation stages about the fourth axis. In addition to the position adjustment mechanisms, a Y-axis linear lock 206 is shown at the back of the groove cutting apparatus. Adjustment of the Y-axis linear lock secures the linear position of the stone 40 along the second axis.

Knob 112 for rotating the stone about the sixth axis is also illustrated. It can also be seen that bracket 208 for adjusting the position of guide 108 is coupled to mounting arm 50. Similarly, stop 106 is attached to base 20. Set screws 210 (partially obscured by know 112) and 212, when loosened, allow the position of guide bracket 208 and stop 106 respectively to be adjusted to vary the rotational displacement of the mounting arm 50 along the fifth axis.

Figure 3:
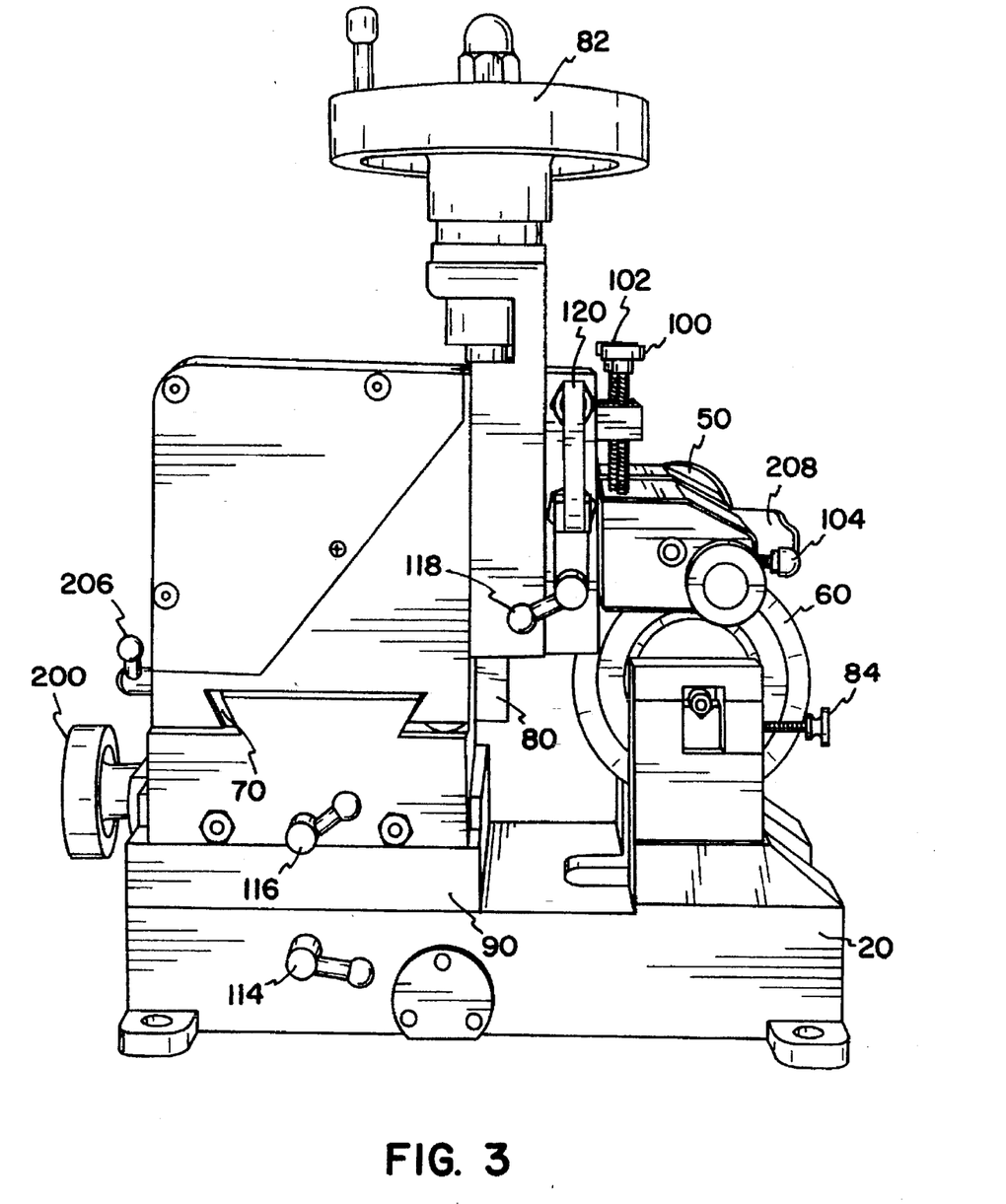
FIG. 3 is a left side view of the groove cutting apparatus in accordance with the present invention.

FIG. 3 is a left side view of the groove cutting apparatus 10 in accordance with the present invention. In FIG. 3 the left to right linear translation stage 70 for aligning the stone along the second axis relative to the plane of the cutting blade 60 is prominent. Also prominent in FIG. 3 are the Z-axis rotational lock 114, the X-axis linear lock 116, and the Z-axis linear lock 118. At the back of the groove cutting apparatus 10, knob 200 for adjusting the linear translation stage in the X direction along the first axis and the Y-axis linear lock 206 are also visible.

Figure 4:
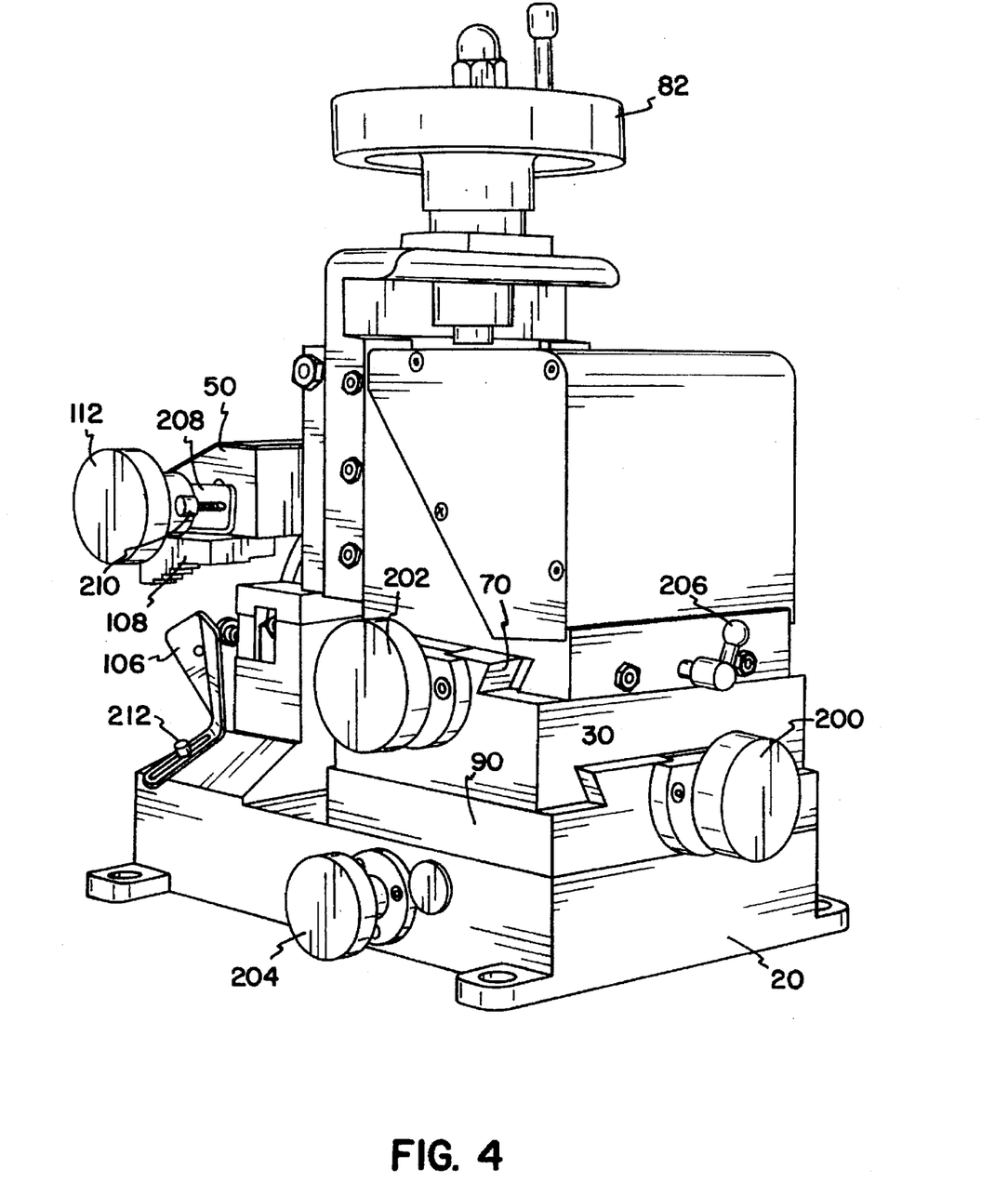
FIG. 4 is a rear view of the groove cutting apparatus 10 in accordance with the invention.

FIG. 4 is a rear view of the groove cutting apparatus 10 in accordance with the invention. In FIG. 4 knob 200 for adjusting the linear translation stage in the X direction along the first axis and the Y-axis linear lock 206 are prominent. In addition, the other mechanisms for adjusting the position of the linear and angular translation stages can be clearly seen. Knob 202 for adjusting the left to right translation stage 70 in the Y direction along the second axis, and knob 204 for rotating the composite linear translation stages 30, 70, 80 about the fourth axis are shown mounted to the right side of the groove cutting apparatus.

FIG. 4 also provides a clearer illustration of knob 112. Adjustment of knob 112 rotates the stone 40 about the sixth axis in line with the finger elements 110. FIG. 4 also shows bracket 208 for adjusting the position of guide 108 as well as set screws 210 and 212.

Figure 5:
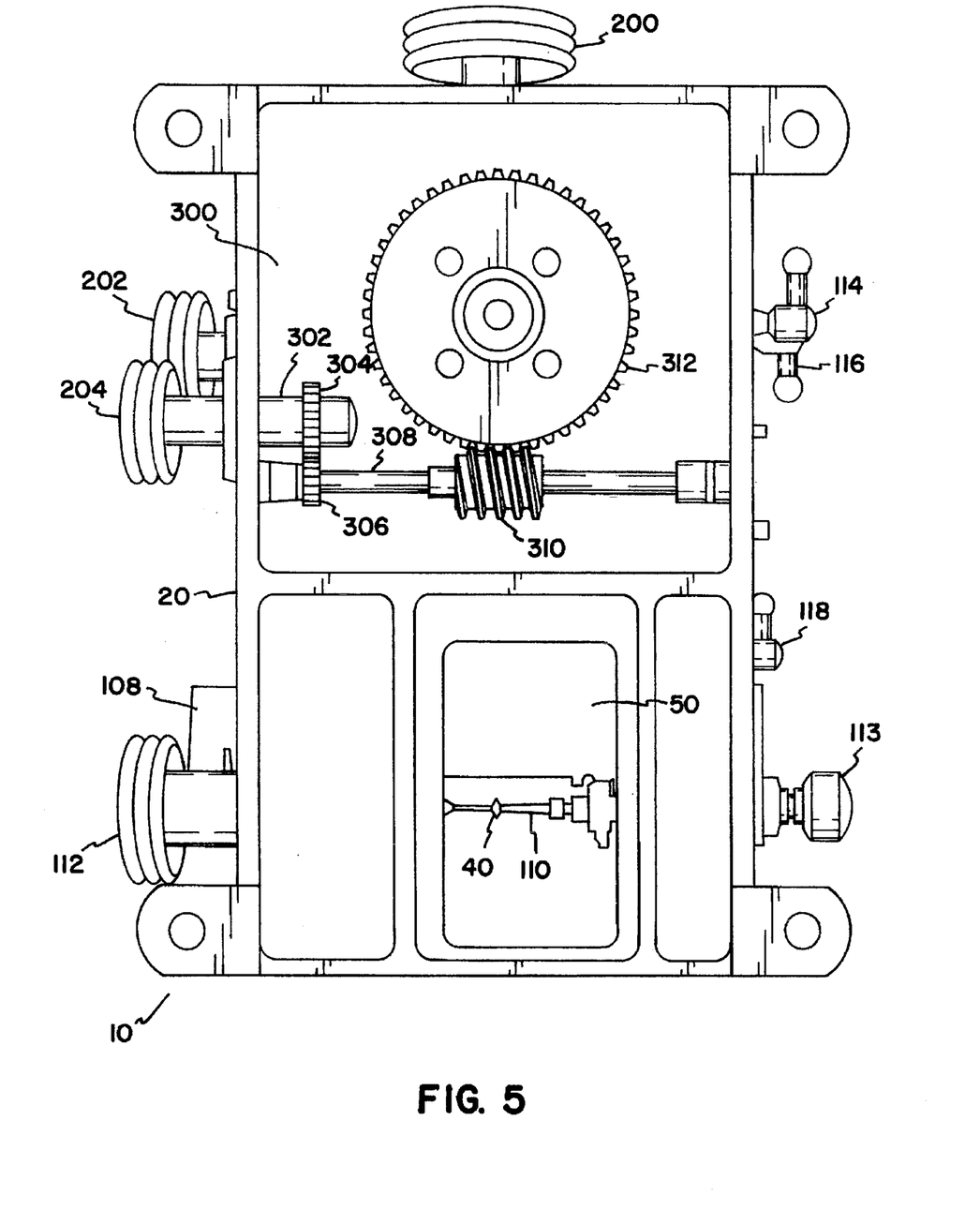
FIG. 5 is bottom view of the groove cutting apparatus 10 in accordance with the invention wherein the gear mechanism for rotating the linear composite translation stage about the Z axis is illustrated.

FIG. 5 is bottom view of the groove cutting apparatus 10 in accordance with the invention wherein a gear mechanism 300 for rotating the composite linear translation stages 30, 70, 80 about the fourth axis is illustrated. Knob 204 rotates pinion 302. The sprocket 304 on pinion 302 meshes with the sprocket 306 on shaft 308. Shaft 308 extends across the width of the base 20. Disposed at the center of shaft 308 is a worm gear 310. The worm gear 310 engages sprocket 312 causing sprocket 312 to rotate when knob 204 is turned. Sprocket 312 is attached to a shaft (not shown) which is in turn attached to the bottom 90 of the forward and backward linear translation stage 30. Thus, rotation of sprocket 312 causes the composite linear translation stages 30, 70, 80 to rotate about the fourth axis with respect to the base 20.

Figure 6:
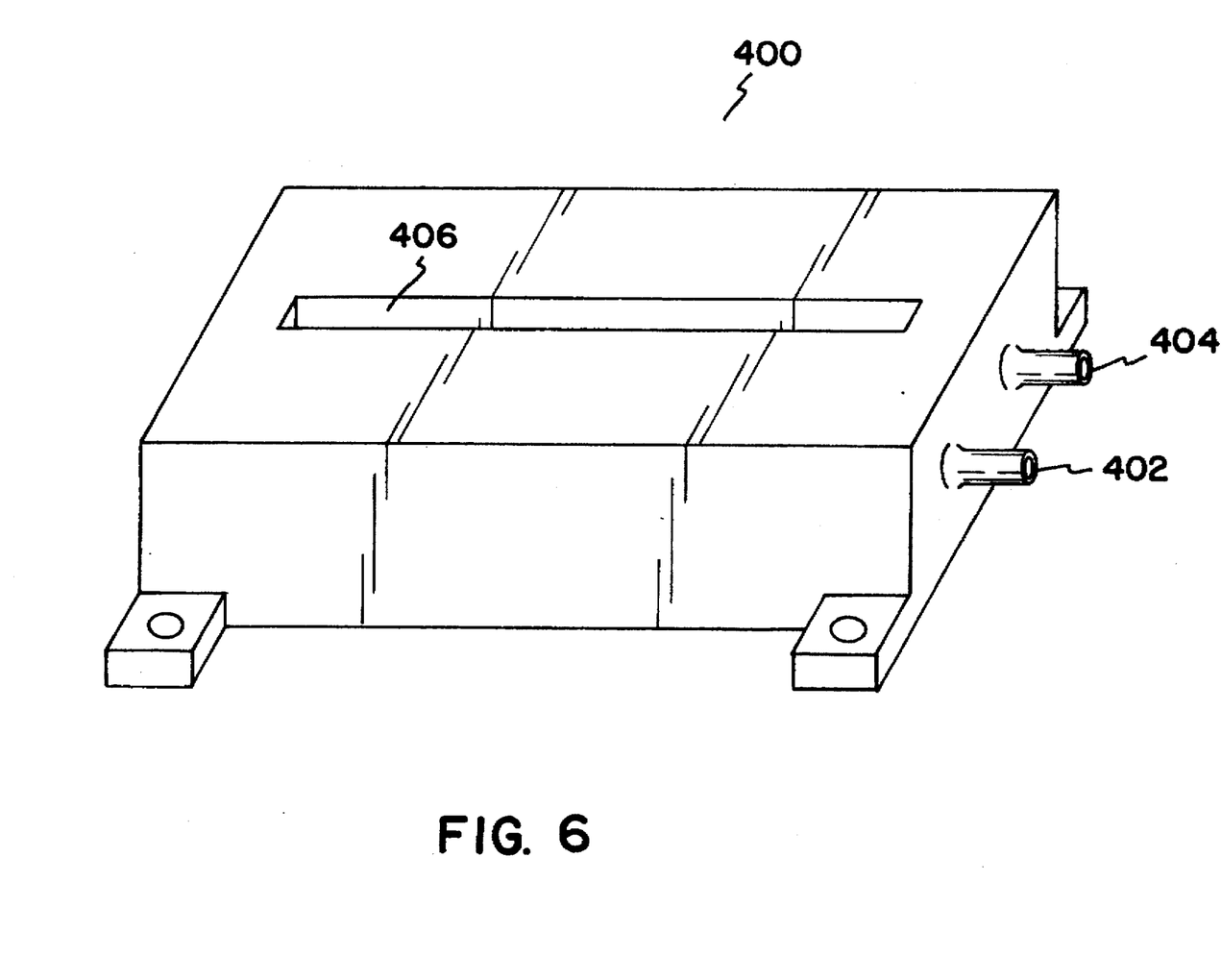
FIG. 6 is a perspective view of the cooling mechanism for minimizing the heat generated by the blade.

FIG. 6 is a perspective view of the cooling mechanism 400 for minimizing the heat generated by the blade 60 thereby preventing discoloration of the stone as the grooves are cut into the stone. The cooling mechanism is positioned between caps 85 beneath the cutting blade 60. A liquid coolant is pumped into a cavity (not shown) within the cooling mechanism 400 through an input port 402. The coolant then exits the cooling mechanism 400 via the exit port 404. The blade 60 rests in the slot 406 at the top of the cooling mechanism 400. During the groove cutting process, the temperature of the edge of the blade 60 will increase. However, as the blade 60 rotates, the portion within the slot 406 contacts the liquid coolant and is cooled. Thus, the blade 60 is never allowed to heat to a temperature which will cause discoloration of the stone being cut. Further, the cooling mechanism 400 is designed so that the liquid coolant is not propelled out of the cooling mechanism 400 through the slot 406 by the rotation of the blade 60. Thus, the groove cutting environment is optimally maintained.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An apparatus for cutting grooves into diamonds and precious stones particularly useful for invisible settings, comprising:

a base;

an adjustable mounting arm for holding a stone;

grooving means, coupled to the base, for cutting grooves into the stone, the grooving means comprising cooling means for dissipating the heat generated by the grooving means to prevent discoloration of the stone as the grooves are cut into the stone; and a plurality of translation stages, coupled to the base and the mounting arm, the translation stages providing linear movement along orthogonal axes in the x, y and z direction and rotational movement about orthogonal axes in the x, y and z direction.

2. The apparatus of claim 1 further comprising a fourth axis of rotational movement, the fourth axis being in the z direction parallel to but disposed from the first z rotational axis.

3. The apparatus of claim 2 further comprising a fifth axis of rotational movement, the fourth axis being in the y direction parallel to but disposed from the first y rotational axis.

4. The apparatus of claim 1 further comprising a fourth axis of rotational movement, the fourth axis being in the y direction parallel to but disposed from the first y rotational axis.

5. The apparatus of claim 1 further comprising a lock coupled to each translation stage for securing the position of the translation stages to prevent movement of the stone relative to the grooving means.

6. The apparatus of claim 1, wherein the grooving means comprises a rotating blade and the cooling means comprises a blade receptor containing a liquid coolant, the liquid coolant being in communication with the blade thereby dissipating the heat generated by the blade as the grooves are cut into the stone.

7. A method for holding and positioning diamonds and precious stones while grooves for invisible settings are cut into the diamonds and precious stones, comprising the steps of:

mounting a stone into a holding arm supported by a base;

moving the stone linearly, forward and backward along a first axis using a x translation stage;

moving the stone linearly, left and right along a second axis using a y translation stage;

moving the stone linearly, up and down along a third axis using a z translation stage;

swiveling the x translation stage about a fourth axis in the z direction;

holding and adjusting the angular position of the stone relative to the cutting means about a fifth axis parallel to, but displace from the second axis;

cutting grooves into the stone using a cutting means; and cooling the cutting means to prevent discoloration of the stone as the grooves are cut into the stone.

8. The method of claim 7, further comprising the step of rotating the stone about a sixth axis, the sixth axis being in the x direction and orthogonal to the fifth axis.

9. An apparatus for holding and maneuvering diamonds and precious stones particularly useful for cutting grooves used for invisible settings, comprising:

a support platform having a top planar surface;

cutting means, coupled to the support platform, for cutting grooves into a stone, the cutting means comprising cooling means for minimizing the heat generated by the cutting means to prevent discoloration of the stone as the grooves are cut into the stone;

a forward and backward translation stage for moving the stone along a first axis;

a left to right translation stage coupled to the forward and backward translation stage for moving the stone along a second axis;

an up and down translation stage coupled to the left to right translation stage for moving the stone along a third axis;

a rotating translation table, disposed between the forward and back translation table and the support platform, for swiveling the forward and back translation stage about a fourth axis, the fourth axis being orthogonal to the first and second axes; and an adjustable mounting arm, rotatably coupled to the up and down translation stage, for holding and adjusting the angular position of the stone relative to the cutting means about a fifth axis parallel to, but displace from the second axis.

10. The apparatus of claim 9, wherein the mounting arm further comprises holding means for securing the stone, the holding means being rotatable about a sixth axis, the sixth axis being orthogonal to the fifth axis.

11. The apparatus of claim 10, wherein the mounting arm is pivotally coupled to the up and down translation stage about a seventh axis, the seventh axis being parallel to the second axis.

12. The apparatus of claim 11, wherein the mounting arm is further pivotally coupled to the up and down translation stage about an eighth axis, the eighth axis being orthogonal to the fifth axis.

13. The apparatus of claim 9, wherein the cutting means comprises a rotating blade and the cooling means comprises a blade receptor containing a liquid coolant, the liquid coolant being in communication with the blade thereby dissipating the heat generated by the blade as the grooves are cut into the stone.

* * * * *